United States Patent [19]

Holcombe et al.

[11] 3,917,782

[45] Nov. 4, 1975

[54] METHOD FOR PREPARING THIN-WALLED CERAMIC ARTICLES OF CONFIGURATION

[75] Inventors: Cressie E. Holcombe; George L. Powell, both of Oak Ridge, Tenn.

[73] Assignee: The United States of America as represented by the United States Energy Research and Development Administration, Washington, D.C.

[22] Filed: May 16, 1973

[21] Appl. No.: 361,000

[52] U.S. Cl. .................. 264/81; 264/60; 264/230; 264/DIG. 71; 264/DIG. 72
[51] Int. Cl.² ................ B29C 5/02; B29C 13/04
[58] Field of Search . 264/56, 81, DIG. 71, DIG. 72, 264/230, 60

[56] References Cited
UNITED STATES PATENTS

| | | | |
|---|---|---|---|
| 3,467,583 | 9/1969 | Noimer | 264/81 |
| 3,560,364 | 2/1971 | Burkhardt | 264/81 |
| 3,568,723 | 3/1971 | Sowards | 264/60 |
| 3,576,932 | 2/1969 | Biddulph | 264/81 |

FOREIGN PATENTS OR APPLICATIONS

| | | | |
|---|---|---|---|
| 654,294 | 12/1962 | Canada | 264/81 |

*Primary Examiner*—Donald J. Arnold
*Assistant Examiner*—John Parrish
*Attorney, Agent, or Firm*—John A. Horan; David S. Zachry; Earl L. Larcher

[57] ABSTRACT

A method for preparing a hollow thin-walled ceramic product is described. Ceramic powder is plasma-sprayed onto a concave surface of a substrate having a coefficient of thermal expansion less than that of the ceramic. The coated substrate is heated to sinter the ceramic and then cooled to effect a separation of the ceramic product from the substrate.

6 Claims, No Drawings

METHOD FOR PREPARING THIN-WALLED CERAMIC ARTICLES OF CONFIGURATION

The present invention was made in the course of, or under, a contract with the U.S Atomic Energy Commission.

The present invention relates generally to thin-walled ceramic products of a hollow configuration and more particularly to the method of preparing such products.

Ceramic artifacts such as crucibles, crucible liners, containers for fast quenching experiments and sintering operations, susceptor liners, conduits or tubulations, etc. are often required in the practice of various chemical and metallurgical procedures where the selected ceramic is compatible, i.e., essentially non-reactive, with the material being worked upon, particularly at elevated temperatures under vacuum or in the presence of various oxidizing, reducing and other reactive atmospheres. Previous techniques for preparing such artifacts including slip casting and sintering, hot pressing, extrusion and simple lay-up procedures have met with some success except in the fabrication of artifacts as mentioned above in thin-walled (wall thicknesses less than about 0.05 inch) configurations of densities greater than about 85 percent theoretical due to cracking and distortion of the walls caused by volume changes during temperature recycling.

It is the aim or primary goal of the present invention to provide a method of fabricating thin-walled hollow artifacts or products which do not suffer the deleterious cracking and deformation problems encountered by practicing previous fabrication techniques. This goal is achieved by the steps of plasma-spraying a layer or coating of metal oxide or ceramic powders onto a reusable metal mandrel or substrate which has a substantially lower coefficient of linear thermal expansion [CTE in units of $(°C)^{-1}$] than the ceramic layer and so configured as to encompass the sprayed layer, heating the coated mandrel to sinter the ceramic coating, and then cooling the coated mandrel to cause the ceramic layer to shrink away or separate from the metal substrate so as to form a freestanding, thin-walled ceramic article.

Other and further objects of the invention will be obvious upon an understanding of the illustrative method about to be described, or will be indicated in the appended claims, and various advantages not referred to herein will occur to one skilled in the art upon employment of the invention in practice.

Described generally, the present invention is directed to a method of preparing ceramic articles of a configuration having a surface of revolution with or without a closed end as defined respectively by a crucible or container and a tubulation or right-angled cylinder. The method comprises the steps of plasma-spraying metal oxide or ceramic powder in air onto a concave surface of a mandrel to form a ceramic layer or coating of the desired thickness, heating the coated mandrel in vacuum to a temperature adequate to sinter and anneal the ceramic layer, cooling the coated mandrel to effect separation of the sintered ceramic layer from the mandrel, and thereafter removing the separated ceramic layer from the mandrel to provide a freestanding, thin-walled ceramic article having a wall thickness in the range of 0.005 to 0.20 inch.

In order to effect the separation of the ceramic layer from the mandrel the latter must have a CTE substantially lower than the ceramic material forming the plasma-sprayed layer. It has been found that suitable mandrels may be formed from materials having a mean CTE of about $5 \times 10^{-6}$ over a temperature range of 25° to 1,000°C. since most ceramic materials have mean CTE's greater than about $8 \times 10^{-6}$ over a corresponding temperature range. A difference in the CTE between the mandrel and the ceramic of about $3 \times 10^{-6}$ is necessary to effect the desired separation. Satisfactory results have been achieved by forming the mandrel of tungsten, which has a melting point of 3,410°C. and a CTE of $4.8 \times 10^{-6}$ (25°–1,000°C.), or an alloy formed of tungsten, 3.5 weight percent nickel, and 1.5 weight percent iron. This alloy has a melting point of 1,500°C. and a CTE of $5.2 \times 10^{-6}$ (25°–1,000°C.). It may be preferable to use the alloy in most cases due to its superior machinability over tungsten. However, if the sintering temperatures required for the ceramic material are greater than about 1,300°C., it may be preferable to use the tungsten metal. The ceramic articles formed by the plasma-spraying may be made of materials such as alumina, which has a CTE of $8.5 \times 10^{-6}$ at 25°–1,000°C.; aluminum titanate, which has a CTE of about $9.5 \times 10^{-6}$ at 25°–1,000°C.; zirconium titanate, which has a CTE of $7.9 \times 10^{-6}$ at 25°–1,000°C.; and magnesium zirconate, which has a CTE of $12 \times 10^{-6}$ at 25°–1,000°C. Each of these ceramic materials at a pre-spray particle size of less than 200 mesh may be readily sintered at a temperature in the range of about 1,300°–1,800°C. Other ceramic materials which may be employed in the present method are stabilized zirconium oxide, thorium oxide, chromium oxide, and any other ceramic which can be plasma-sprayed and for which a suitable substrate mandrel can be found. Other possible mandrel materials include other refractory metals such as niobium, tantalum, and molybdenum, their alloys such as Mo-0.5 Ti and 90 Ta-10 W, graphite, and metals with higher CTE values if the ceramic has the required higher CTE.

Further, to assure separation of the ceramic layer from the mandrel the plasma-spraying operation is preferably accomplished in air, since vacuum and inert atmospheres such as argon promote adhesion of the layer to the mandrel.

In order to form the layer of ceramic material the selected ceramic is comminuated into powder of a size less than 200 mesh with an average particle size of about 74 microns. This powder was sprayed by a conventional, commercially available plasma-flame spray gun onto the mandrel. The resulting ceramic layer upon completion of the spraying operation has a density of about 90 percent of theoretical density and open porosity. Upon completing the spraying operation the coated mandrel is heated in vacuum of about $10^{-5}$ torr or in an inert atmosphere such as argon or helium to a temperature in the range of about 1,300°–1,800°C, to sinter and anneal the ceramic layer. As the temperature is so increased the ceramic material, due to its greater CTE than the mandrel, is expanded against the mandrel so as to be held in compression by the latter. This feature significantly reduces the tendency of ceramic layer to crack and distort during volume changes induced by temperature cycling. Further, the expansion of ceramic layer against the encompassing mandrel during this temperature increase presses the material so as to densify the latter during the sintering and annealing (stress-relieving) operation. Upon completion of the sintering-annealing operation, which normally requires a duration of about 1 to 4 hours, the coated mandrel is cooled to room temperature. During this cool-down the ceramic layer is not distorted more than approximately 1 percent of its overall dimension as it shrinks away and separates from the mandrel due to its greater CTE. The surface of the ceramic article adjacent to the mandrel has the same surface finish as the mandrel.

The configuration of the mandrel found suitable for practicing the present invention is one that will provide a concave surface about the layer of ceramic material. The inner walls of the mandrel forming this surface or receptacle for the ceramic material may be slightly tapered, i.e., up to about 5°, and have a depth of up to about 2 inches and a diameter of up to about 2 inches. Alternatively, the receptacle may be in the form of a right-angled cylinder of a diameter and a depth limited only by the spraying capabilities of the plasma gun.

To more clearly set forth features of the present invention examples relating to the fabrication of ceramic artifacts are set forth below.

EXAMPLE I

A tungsten-3.5 percent nickel-1.5 percent iron alloy mandrel having a maximum inner diameter of 2.0 inches, a depth of 1.0 inch, a wall taper of 5° to the mandrel axis, and corners that were rounded to a minimum radius of 0.05 inch was plasma-sprayed in air with aluminum titanate powder. The powder was prepared from commercially obtained aluminum and titanium oxide having an average particle size less than 25 microns. Stoichiometric proportions of the oxides were blended, pressed and sintered to form a compact. The compact was ground into powder having an average particle size of less than 74 microns for the plasma-spraying operation. After the mandrel was sprayed with the aluminum titanate powder, the coating was sintered in a furnace gradually heated to 1,300°C. over a 3-hour period at a pressure of $1 \times 10^{-5}$ torr. After the furnace cooled to room temperature, the coated crucible was removed by simply inverting the crucible. Three aluminum titanate crucibles having 0.012 ±0.002-inch wall thicknesses were made in this manner.

EXAMPLE II

One alumina crucible having a 0.012 ±0.002-inch wall thickness and one magnesium zirconate crucible having a wall thickness of 0.017 ±0.003 inch were prepared as in Example I using commercially available −200 mesh powders. This demonstrates that ceramic oxide articles with a wide range of thermal expansion coefficients can be fabricated by this method.

EXAMPLE III

A tungsten-3.5 percent nickel-1.5 percent iron alloy mandrel having a receptacle in the shape of a right-angle cylinder 0.3785 inch in diameter by 0.5 inch deep was plasma-sprayed in air with alumina to a nominal thickness of 0.015 inch. Thickness variations of ±0.005 inch resulted due to the difficulty of plasma-spraying within such a small opening. After a 1-hour sinter at 1,300°C. and cool-down, the alumina crucible was removed from the mandrel intact. The resulting crucible had an outer diameter of 0.375 ±0.002 inch and a density of about 90 percent theoretical.

It will be seen that the present invention affords a significant improvement over previously employed techniques of fabricating ceramic structures since the present method provides for the ready application having a wall thickness — to overall size ratio less than 0.1 whereas previous practices of forming such structures with wall thicknesses less than 0.02 inch by slip casting and extrusion were limited to wall thickness — to overall size ratio no less than 0.1. Further, the freestanding ceramic products produced by the subject method have a wall thickness in the range of about 0.005 to 0.200 inch and a density of at least 90 percent theoretical.

What is claimed is:

1. A method of manufacturing a freestanding, hollow ceramic article of a concave configuration with a wall thickness in the range of 0.005 to 0.20 inch and a density of at least 90 percent theoretical, comprising the steps of plasma flame spraying powdered ceramic material onto a concave surface within a reusable metal substrate to form a coating of the ceramic material on said surface, said metal substrate having a coefficient of thermal expansion substantially less than that of said ceramic material, heating the coated substrate to a temperature adequate to anneal and sinter the ceramic coating with said heating simultaneously effecting the expansion of the ceramic coating against the substrate for holding the coating in compression, reducing the temperature of the coated substrate to shrink the ceramic coating relative to the substrate to effect separation of the ceramic coating from the substrate, and thereafter removing the resulting ceramic article from the substrate.

2. The method of manufacturing a hollow ceramic article as claimed in claim 1, wherein the difference in the average coefficient of thermal expansion between the substrate and the ceramic material is at least about $3 \times 10^{-6}$ over a temperature range of 25°–1,000°C.

3. The method of manufacturing a hollow ceramic article as claimed in claim 2, wherein said substrate is of a metal or alloy having an average coefficient of thermal expansion less than about $5 \times 10^{-6}$ over a temperature range of 25°–1,000°C., and wherein said ceramic material has an average coefficient of thermal expansion greater than about $8 \times 10^{-6}$ over a temperature range of 25°–1,000°C.

4. The method of manufacturing a hollow ceramic article as claimed in claim 2, wherein the reusable substrate is of a metal or alloy selected from the group consisting of tungsten, a tungsten alloy containing 3.5 weight percent nickel and 1.5 weight percent iron, molybdenum, tantalum, niobium, and graphite.

5. The method of manufacturing a hollow ceramic article as claimed in claim 3, wherein said ceramic material is selected from the group consisting of aluminum titanate, alumina, zirconium titanate, magnesium zirconate, stabilized zirconium oxide, thorium oxide, and chromium oxide, and wherein the particle size of the powdered ceramic material is less than 200 mesh.

6. The method of manufacturing a hollow ceramic article as claimed in claim 5, wherein the ceramic material is plasma-sprayed onto said concave surface in air, wherein the temperature adequate to anneal and sinter the substrate is in the range of 1,300° to 1,800°C., wherein duration of said heating step is in the range of 1 to 4 hours in an inert atmosphere or a vacuum at a pressure of about $10^{-5}$ torr, and wherein the temperature is reduced to room temperature after said heating step.

* * * * *